(12) United States Patent
Koivisto et al.

(10) Patent No.: US 11,174,123 B2
(45) Date of Patent: Nov. 16, 2021

(54) CONNECTION ESTABLISHMENT IN ELEVATOR SYSTEM, ESCALATOR SYSTEM OR AUTOWALK SYSTEM

(71) Applicant: Kone Corporation, Helsinki (FI)

(72) Inventors: Ari Koivisto, Helsinki (FI); Jere Vuorenala, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 16/374,856

(22) Filed: Apr. 4, 2019

(65) Prior Publication Data

US 2019/0225457 A1 Jul. 25, 2019

Related U.S. Application Data

(63) Continuation of application No. PCT/FI2017/050694, filed on Oct. 4, 2017.

(30) Foreign Application Priority Data

Oct. 5, 2016 (EP) .................................... 16192405

(51) Int. Cl.
   *B66B 1/34*        (2006.01)
   *H04W 76/10*    (2018.01)
   *H04W 4/33*     (2018.01)
   *B66B 25/00*    (2006.01)
   *H04W 4/14*     (2009.01)

(52) U.S. Cl.
   CPC .......... *B66B 1/3453* (2013.01); *B66B 1/3461* (2013.01); *B66B 25/00* (2013.01);
(Continued)

(58) Field of Classification Search
None
See application file for complete search history.

(56) References Cited

U.S. PATENT DOCUMENTS

| 7,246,176 | B2 * | 7/2007 | Mizell | H04W 76/12 |
| | | | | 709/245 |
| 8,630,283 | B1 * | 1/2014 | Breau | H04L 12/6418 |
| | | | | 370/352 |

(Continued)

FOREIGN PATENT DOCUMENTS

| CN | 101346931 A | 1/2009 |
| CN | 102907164 A | 1/2013 |

(Continued)

OTHER PUBLICATIONS

European Search Report with Application No. 16192405 dated Apr. 6, 2017.

(Continued)

*Primary Examiner* — Shripal K Khajuria
(74) *Attorney, Agent, or Firm* — Harness, Dickey & Pierce, P.L.C.

(57) ABSTRACT

The present invention relates to a method for initiating a data connection between a central server and a control unit communicatively coupled to an elevator, escalator or autowalk. The method comprises: receiving a trigger signal from the central server, wherein the trigger signal is delivered with a service of a mobile communication network into which the control unit is communicatively coupled to; detecting if the trigger signal complies with at least one pre-defined requirement; and in response to a positive outcome of the detection initiating a data connection establishment from the control unit to the central server. The invention also relates to a control unit for an elevator, escalator or autowalk.

10 Claims, 4 Drawing Sheets

(52) U.S. Cl.
CPC ............... *H04W 4/14* (2013.01); *H04W 4/33* (2018.02); *H04W 76/10* (2018.02)

(56) References Cited

U.S. PATENT DOCUMENTS

| | | | |
|---|---|---|---|
| 2003/0204627 | A1 | 10/2003 | Mizell et al. |
| 2014/0269779 | A1* | 9/2014 | Shan ................. H04W 52/0216 370/509 |
| 2016/0029214 | A1 | 1/2016 | Lu |
| 2017/0187852 | A1* | 6/2017 | Baek ....................... H04N 5/232 |
| 2019/0130442 | A1* | 5/2019 | Celik ................. H04M 3/42195 |

FOREIGN PATENT DOCUMENTS

| | | |
|---|---|---|
| EP | 2393266 A1 | 12/2011 |
| EP | 2806668 A1 | 11/2014 |
| EP | 2924944 A1 | 9/2015 |
| FI | 20070416 A | 11/2008 |
| WO | WO-2008145803 A1 | 12/2008 |
| WO | WO-2014070649 A1 | 5/2014 |
| WO | WO-2014200487 A1 | 12/2014 |

OTHER PUBLICATIONS

International Search Report PCT/ISA/210 for International Application No. PCT/FI2017/050694 dated Jan. 15, 2018.

Written Opinion of the International Searching Authority PCT/ISA/237 for International Application No. PCT/FI2017/050694 dated Jan. 15, 2018.

Written Opinion of the International Preliminary Examining Authority PCT/IPEA/408 for International Application No. PCT/FI2017/050694 dated Jan. 15, 2018.

Chinese Office Action dated Feb. 25, 2020 for CN Application No. 201780061916.X.

* cited by examiner

CONNECTION ESTABLISHMENT IN ELEVATOR SYSTEM, ESCALATOR SYSTEM OR AUTOWALK SYSTEM

This application is a continuation of PCT International Application No. PCT/FI2017/050694 which has an International filing date of Oct. 4, 2017, and which claims priority to European patent application number 16192405 filed Oct. 5, 2016, the entire contents of both of which are incorporated herein by reference.

TECHNICAL FIELD

The invention relates generally to a technical field of remote monitoring. More particularly, the invention relates to establishment of connection for remote monitoring purposes in elevator, escalator or autowalk environment.

BACKGROUND

Remote monitoring is an important area in many industrial areas. The aim is to receive and transmit data between a remote device and a central unit in order to monitor and control an operational state of the remote device. The remote monitoring is important in an area of elevator, escalator or autowalk solutions wherein it is necessary to detect problems and/or emergency situations as well as analyze the information after it is remotely obtained.

In order to establish the remote monitoring system for the elevators and the like a connection shall be established between the remote device, i.e. the elevator, and the central unit, i.e. a central server. The remote monitoring is currently arranged so that at least one mobile terminal is operatively coupled with at least one elevator in order to establish a connection between the elevator and a central server via the mobile terminal. In order to maintain the communication dedicated for the elevator monitoring so called private wireless network is used. The wireless private network enables a direct connection between the private network servers and the remote routers residing in the elevator control unit. Generally speaking the wireless private network is only accessible by predetermined subscribers authenticated and authorized by an operator providing the wireless virtual network.

The information transmitted between the entities in the wireless private network is delivered over Internet Protocol (IP) wherein the physical connection is established by means of the mobile communication network, or a sub-network, into which the subscription is accessible. Hence, the mobile terminal is equipped with necessary subscription which enables the access to the wireless private network, which is a sub-network of the mobile communication network. The subscription may refer to subscriber identity card (SIM), for example. The communication established over IP protocol requires that each terminal is provided with IP address at a time of communication. However, the IP communication over the mobile communication networks is typically arranged so that there is a pool of IP addresses assignable to mobile terminals. This means that they are not typically static, as it is not meaningful to reserve an IP address for a random mobile communication. As a result of this arrangement it may turn out to be hard to initiate communication towards a mobile terminal residing in an elevator as the central server does not necessarily know an IP address of some certain mobile terminal operatively coupled to an elevator which the central server intends to reach. The same applies in the context of wireless private networks wherein a predetermined IP address space is reserved for entities belonging to the wireless private network in question.

The dynamic IP address problem is tried to be solved by arranging the elevator side, i.e. the mobile terminal side, to send a message to one or more central servers at short intervals, thus transmitting its IP address as well. This gives a very high probability for the server side to use the latest known IP address to connect to the desired elevator. However, a drawback of this arrangement is that the constant periodical messages sent from the elevator do have a cost, and even then there's a small chance for the latest known IP to be wrong.

An example of establishing a machine to machine communication over a mobile communication network is given in a document WO 2014/070649.

Hence, there is need to mitigate the above described drawbacks with novel solutions and arrangements.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method and a control unit for initiating a data connection in elevator, escalator or autowalk environment.

The objectives of the invention are reached by a method and a control unit as defined by the respective independent claims.

According to a first aspect, a method for initiating a data connection between a central server and a control unit communicatively coupled to an elevator is provided, the method comprises: receiving a trigger signal in the control unit from the central server, wherein the trigger signal is delivered with a service of a mobile communication network into which the control unit is communicatively coupled to; detecting if the trigger signal complies with at least one pre-defined requirement; and in response to a positive outcome of the detection initiating a data connection establishment from the control unit to the central server.

The service of the mobile communication network used for the trigger signal may be one of the following: a messaging service, a voice call setup.

The detection may comprise at least one of the following: a comparison of a network identifier of the central server derived from the trigger signal to stored information identifying at least one central server allowed to cooperate with the control unit, the trigger signal payload complies with predetermined criteria.

The initiation of the data connection establishment may comprise a setup of a PDP context between the control unit and a network node residing in the mobile communication network.

The control unit may be configured to obtain a data network address of the central server from a memory accessible to the control unit in response to positive outcome of the detection.

According to a second aspect, a control unit for an elevator is provided, the control unit comprising: at least one processor; at least one memory including computer program code; the at least one memory and the computer program code configured to, with the at least one processor, cause the control unit to perform: receive a trigger signal from a central server, wherein the trigger signal is delivered with a service of a mobile communication network into which the control unit is communicatively coupled to; detect if the trigger signal complies with at least one pre-defined requirement; and initiate, in response to a positive outcome of the detection, a data connection establishment from the control unit to the central server.

The control unit may be configured to receive the trigger signal with the one of the following service of the mobile communication network: a messaging service, a voice call setup.

The detection performed by the control unit may comprise at least one of the following: a comparison of a network identifier of the central server derived from the trigger signal to stored information identifying at least one central server allowed to cooperate with the control unit, the trigger signal payload complies with predetermined criteria.

The control unit may be configured to initiate the data connection establishment by setting up a PDP context between the control unit and a network node residing in the mobile communication network.

The control unit may further be configured to obtain a data network address of the central server from a memory accessible to the control unit in response to positive outcome of the detection.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated. In the following the inventive idea is described by referring to elevators, but the invention is also applicable in escalators and autowalks in a similar manner.

Figure 1:
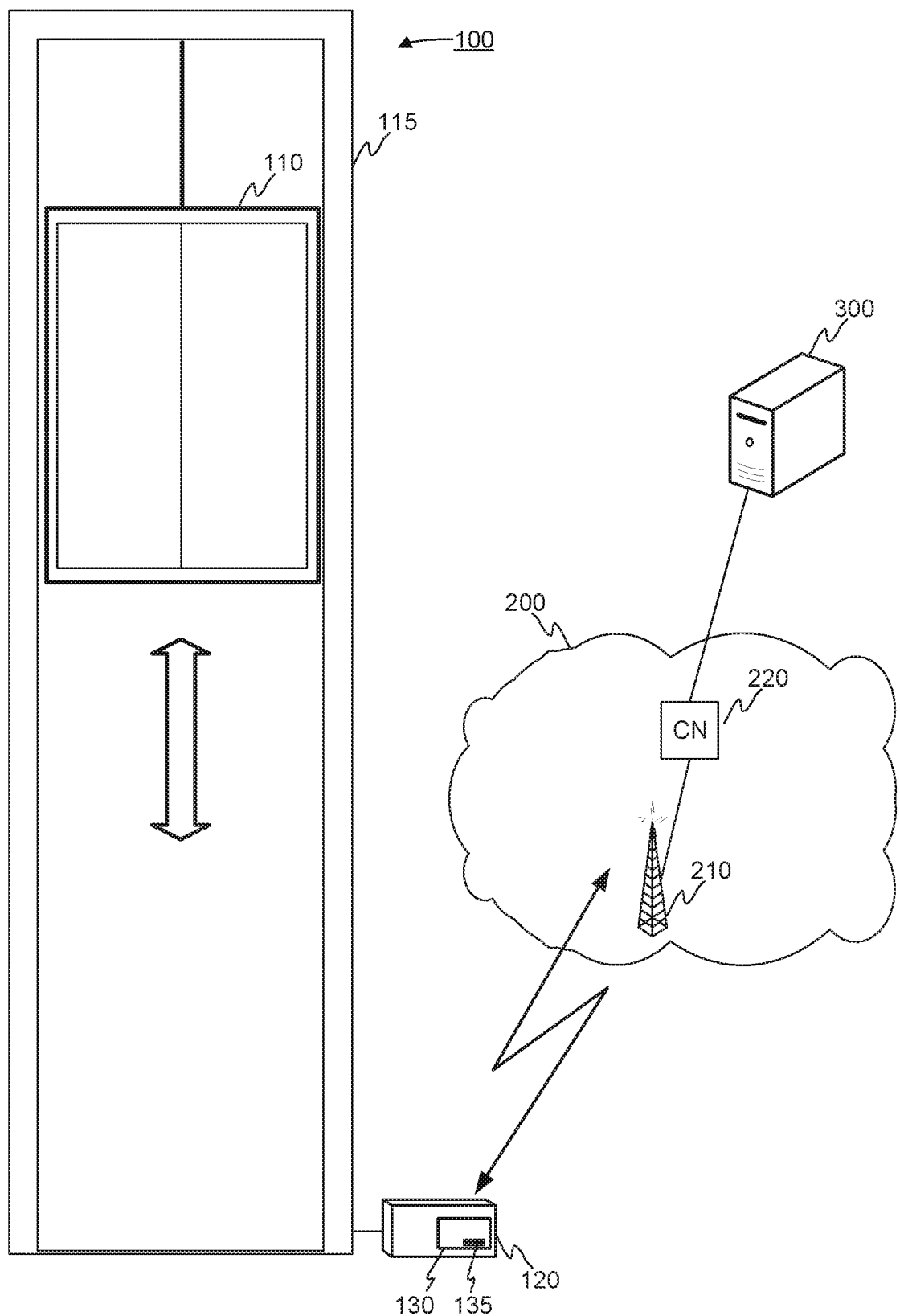
FIG. 1 illustrates schematically an example of an environment wherein the pre-sent invention may be implemented.

FIG. 1 schematically illustrates an example of an elevator environment wherein the present invention may be implemented. One or more elevator cars 110 are arranged to travel along one or more hoistways 115 in a facility 100, such as in a building. The elevator cars 110 are moved along the hoistway 115 by means of a power transmission system comprising e.g. an electrical motor and mechanical transmission elements, such as rope, in order to bring the transmission power to the elevator car 110. Moreover, the elevator solution may comprise one or more controls inside and outside the elevator car(s) for passengers in order to inform the elevator control unit 120 on a need to use the elevator car in question. The control unit 120 is configured to control the operation of the entities belonging to the elevator system as well as obtain information from sensors and measurement arrangement in the elevator. The control unit 120 may be communicatively coupled to any of the entities belonging to the elevator system within the facility in a wired or wireless manner. The control unit 120 may further comprise a transceiver 130 equipped with a subscriber identity module (SIM) 135 for communicating wirelessly with a central server 300 through a mobile communication network 200 into which the transceiver may access by means of the SIM. The mobile communication network 200 may consist of a radio access network (RAN) 210 and a core network 220. The RAN comprises at least base stations and controllers of the base stations. The controllers are typically coupled to base stations and to core network elements in a wired manner. The core network 220, in turn, comprises elements managing and controlling the operation of the mobile communication network as well as registers maintaining information e.g. on subscribers. The central server 300 may thus be coupled with the transceiver through the core network and the radio access network. The central server 300 and the core network element(s) may be communicatively coupled in a wired manner through some interworking units if necessary. Furthermore, the communication of the central server 300 and the one or more transceivers coupled to the control unit 120 may be arranged with a private wireless network in a known manner wherein a specific address space is arranged for the need. For example, the service company monitoring the operation of elevators may be assigned a predetermined sub-network, e.g. IP addresses among other resources, in order to implement the monitoring in the private wireless network. The implementation schematically illustrated in FIG. 1 is a non-limiting example how the communication may be arranged between the control unit 120 of an elevator and the central server 300 within the spirit of the present invention. In other words, FIG. 1 does not automatically disclose all necessary elements or functionalities necessary for the communication, but discloses the fundamental idea for the purpose to describe the present invention.

Figure 2:
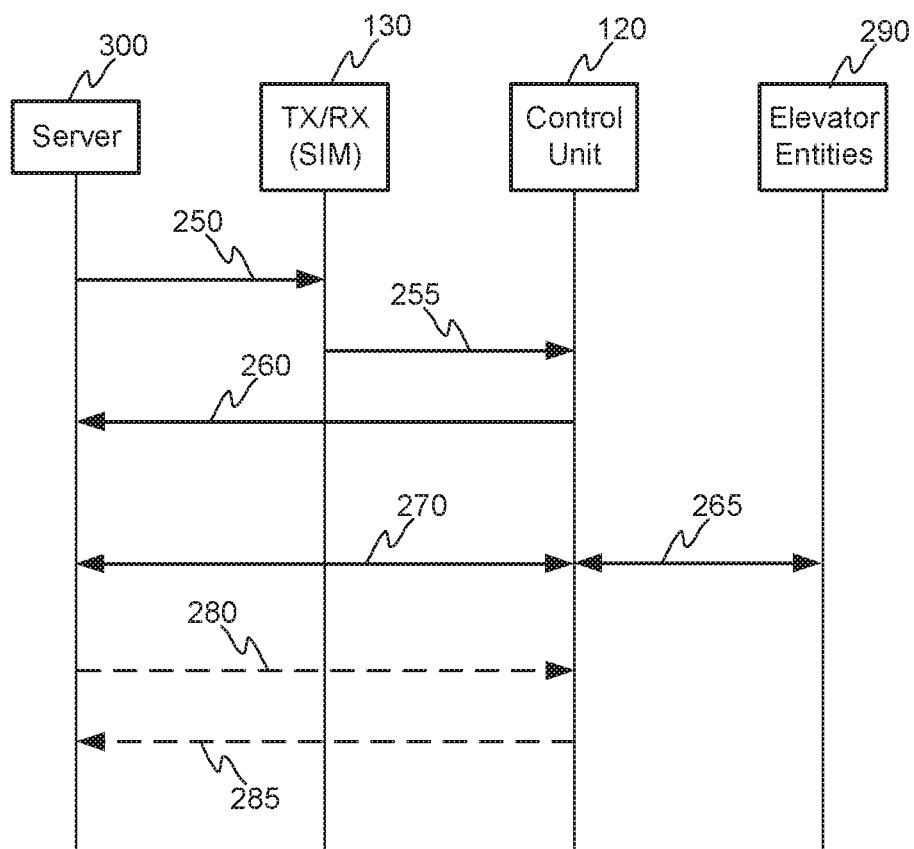
FIG. 2 illustrates schematically a principle of the invention as a flow chart in an exemplified manner.

Next the invention is described by referring to FIG. 2 which illustrates schematically the principle of the invention as a flow chart. An aim of the invention is to initiate an establishment of a data connection between a central server 300 and a transceiver 130 equipped with a subscriber identity module for a mobile communication network in order to utilize services provided by the mobile communication network. This is advantageously performed under control of the control unit 120. The transceiver 130 is communicatively coupled to a control unit 120, which may be configured to control the operation of the transceiver 130 either totally or at least partly. According to an embodiment of the invention the establishment of the data connection is initiated with a trigger signal 250 using of at least one service provided by the mobile communication network. The service used may e.g. be a voice call service or a messaging service, such as short message service, which is a part of so called SS7 control channel. Generally speaking SS7 is a set of signaling protocols that are used to set up most of the telephone calls. In other words it is used for exchanging information between network elements for achieving a certain function, such as a call establishment, in the communication network in question. Now, as the transceiver 130 receives the predetermined trigger signal 250 it may deliver information on the received trigger signal as a data connection establishment request 255 towards the control unit 120, and possibly information derivable from the trigger signal 250 to the control unit 120 of the elevator. The control unit 120 is configured to detect that the data connection request 255, and thus the trigger signal 250, complies with at least one predefined requirement in order to be interpreted as a trigger signal for requesting a data connection from the control unit 120 side towards the server 300. In case the data connection request 255 does not comply with the at least one requirement the control unit 120 may be configured to cancel any and/or all operations originating from the receipt of the trigger signal 250 in the transceiver 130. In a situation, as schematically illustrated in FIG. 2, in which the received data connection request 255, and thus the trigger signal 250, meets the at least one predefined requirement the control unit 120 may be configured to establish the data connection 260 through the transceiver to the central server 300, as will be described in more detail later. In response to the established data connection data obtained 265 from elevator entities 290 by the control unit 120 and/or originating from the control unit 120 itself may be exchanged 270 with the central server 300. Alternatively or in addition, the central server may deliver data to the control unit 120 over the data connection. Such data may e.g. be instructions to the operation of the control unit 120 and/or any elevator entities behind the control unit 120 or any other data relating to the application area. At some point the need for data exchange ends and either the server 300 or the control unit 120 may be configured to cancel the data connection (arrows 280, 285 in FIG. 2).

Next it is discussed on the trigger signal 250 in more detail. As said the trigger signal 250 is according to the invention such that it utilizes at least one service provided by the mobile communication network. According to a first embodiment the service may be a call establishment from the server 300 to a subscriber defined by the subscriber identity module residing in the transceiver 130. Each subscription in the mobile communication network stores an international mobile subscriber identity (IMSI) and its related key, which are used to identify and authenticate the subscriber in question in the mobile communication network. The call establishment as such is defined in a corresponding telecommunication standards and it is not discussed herein. However, generally speaking the central server may store information on the subscription(s) and into which control unit 120 each subscription is allocated. As a result the central server 300 may determine a control unit 120 with whom it intends to exchange information and initiate a call connection towards the subscription over the mobile communication network. In other words, the call connection is initiated by using the IMSI of the subscription in question as a so called B-Number (called party number) in order to reach the subscription in the mobile communication network. Typically, the A-Number (callee party number) is also carried in the call setup request to the called party i.e. the subscription residing in the transceiver 130 communicatively coupled to the control unit 120 of the elevator. According to a second embodiment of the invention, as already mentioned, the service of the mobile communication network used in the trigger signal may be a messaging service. Such a messaging service may e.g. be, but is not limited to, a short message service (SMS) or a multimedia messaging service (MMS). Again, in the messaging services the B-number, i.e. the called party (the recipient of the message) is typically transferred in the message data (e.g. in a header part of the message). The sender information (A-number) may also be transferred, as is a requirement in at least some embodiments of the present invention. Especially in case of that the trigger signal 250 is a message it may be arranged that message body comprises data relevant in view of the present invention, as will be described.

Next it is described a situation in which the transceiver is received a trigger signal into which information the control unit 120 is configured to have access. In a first embodiment the solution according to the invention is implemented so that the trigger signal is a call connection. In other words, the central server 300 is configured to initiate a call setup towards a subscription residing in the transceiver 130. The call setup request according to this embodiment is configured to carry information on the A-number, i.e. a network identifier of the central server 300, and on the B-number, as defined above. When the transceiver 130 receives the call setup request from central server 300 the control unit 120 may be configured to control an operation of the transceiver 130 so that the call setup request is answered and the call connection is established or that the transceiver 130 is controlled so that it does not react to the call setup request at all or that the transceiver 130 is controlled or configured to reject the call setup request actively. Regardless of the implementation the control unit 120 receives information at least on the party (A-number) trying to setup the call towards the subscription residing in the transceiver 130. Now, the control unit 120 may be configured to store information on legitimate A-number(s) in a memory accessible by the control unit 120. Alternatively or in addition, the control unit 120 may be configured to initiate an inquiry to a predefined service if the A-number derived from the call setup request is legitimate or not. The legitimate A-number represents here a party whose connection request is acceptable by the control unit 120. In this case such may be at least one central server 300 with whom the control unit 120 is allowed to exchange data for remote monitoring purposes among other needs if any. If the A-number matches with at least one subscription number, i.e. network identifier, predefined in a memory of the control unit 120 or checked with an inquiry the control unit 120 may be configured to initiate a data connection towards the central server 300.

According to some other embodiment the trigger signal may be implemented with a message, such as a short message. Similarly, as above in the context of call triggering, the control unit 120 may derive sender number from the short message received by the transceiver 130 and perform the check-up as described above. In some further embodiments, in order to improve security, the message body i.e. payload may comprise some additional information which is to be checked by the control unit 120 in order to conclude that the trigger signal is legitimate and a central server 300 is requesting data connection establishment. For example, the legitimate message body may be in a predetermined format, such as it comprises a predefined number of characters and/or it comprises predefined key string(s) and/or it comprises predefined identifiers and/or information disclosed therein is in a predefined order (i.e. the structure of the message is predefined) and in that manner the trigger signal payload complies with predetermined criteria. The implementation is not limited to these examples only. The control unit 120 may be configured to compare the received information in the message body to stored information, or information accessible by the control unit 120 in order to conclude if the trigger signal is acceptable or not. It may be configured so that either the sender number or the information in the message body, or even header information of the message, or any combination of these is used for determining the trigger signal is legitimate or not.

Figure 3:
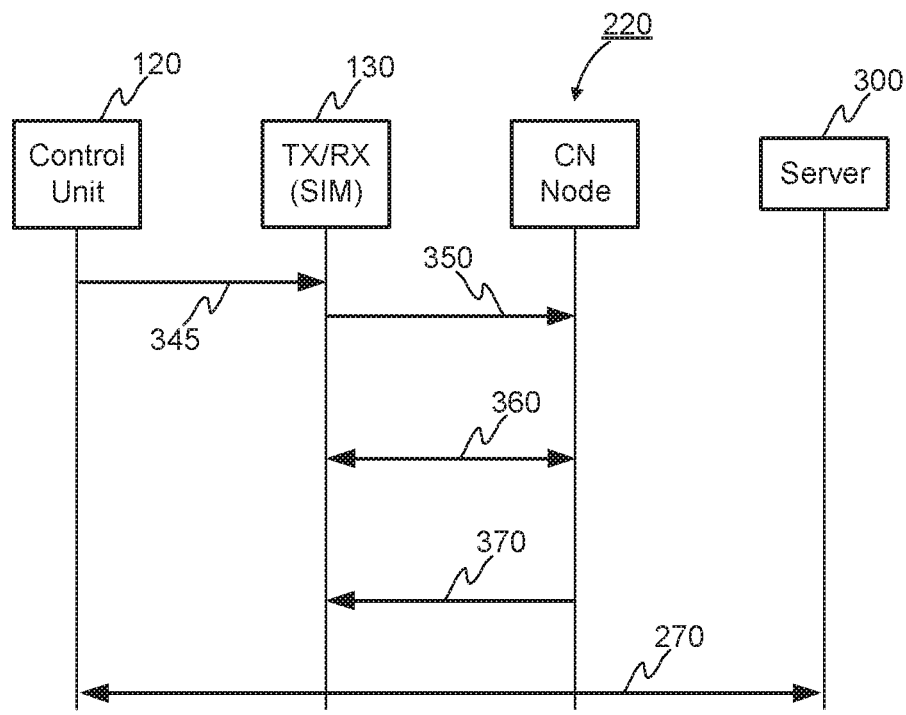
FIG. 3 illustrates schematically an example of a connection establishment.

Next it is described, by referring mainly to FIG. 3, a situation in which the control unit 120 has confirmed that the trigger signal is legitimate and as a result the control unit 120 concludes that a data connection shall be established and may e.g. instruct 345 the transceiver accordingly. As IP data connection is to be established between the control unit via the transceiver 130 and the central server 300 over the mobile communication network 200, the subscription in the transceiver 130 shall establish a packet data connection to the mobile communication network 200 in order to reach the central server 300 for exchanging information. According to an example of the invention the packet data connection may be established by requesting packet data context activation 350 from a core network node. The request may e.g. be an Activate PDP Context Request towards a network node, such as SGSN (Serving GPRS Support Node). The request may carry optional parameters such as the requested QoS, requested NSAPI, MS PDP address, protocol configuration options, and APN (Access Point Name). The APN is defined in the transceiver 130 settings and delivered in the context of the PDP context setup request to the core network node. In response to the receipt of the PDP Context Request 350 in the SGSN, the SGSN may be configured to derive Gateway GPRS Support Node (GGSN) address from the APN identifier in order to forward the request to the GGSN. The GGSN is responsible for the inter-working between the mobile communication network (GPRS network) and external packet switched networks, such as Internet and X.25 network. The SGSN is configured to create a downlink GTP (GPRS Tunneling Protocol) tunnel to route IP packets from the GGSN to the SGSN. Moreover, the SGSN may be configured to perform security functions 360 with the transceiver 130 in order to at least authenticate the transceiver 1130. In response to a successful preparation of the communication channel between the SGSN and GGSN and the SGSN and the transceiver 130 the SGSN may send a confirmation on an activation of the PDP Context (e.g. Activate PDP Context Accept message) 370 to the transceiver 130 with any parameters. Once the PDP context is activated in the mobile communication network and through that to the Internet, the control unit 120 may initiate communication 380 with the central server 300. The initiation of the communication may e.g. be performed so that in response to the receipt of acknowledgement on the activated PDP context the control unit 120 may be configured to retrieve from data storage accessible by it a network address, such as IP address, of the central server 300 residing in the communication network and initiate a connection towards the address with predefined procedures. The description above of the data connection establishment is considered to disclose the essential steps schematically, but not necessarily all details.

Figure 4:
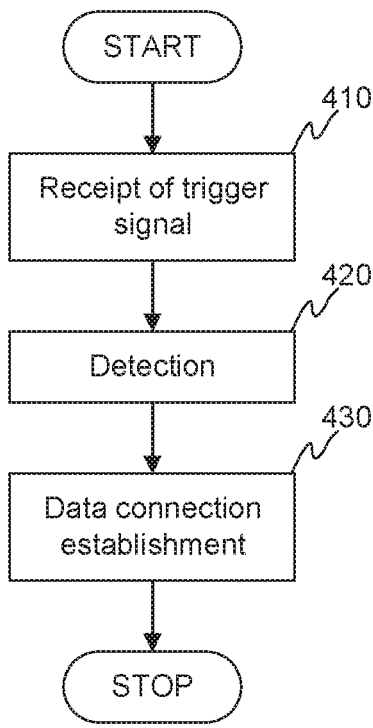
FIG. 4 illustrates schematically a method according to an embodiment of the invention.

FIG. 4 illustrates schematically a method according to an embodiment of the invention from a control unit 120 point of view. Herein it is assumed that the control unit 120 and the transceiver 130 are coupled together and here it is not described any communication between these entities. In the first phase the control unit 410 may receive a trigger signal 410 delivered by using a service provided by a mobile communication network. The service may e.g. be a circuit-switched call setup or a messaging service. The control unit may be configured to detect 420 if the information receipt in the trigger signal, or any other communication initiated with the trigger signal, is legitimate. The check may be performed in the manner as already described. If the trigger signal is legitimate, the control unit 120 may be configured to initiate a data connection establishment 430 to a central server 130 in order to establish a data connection at least partly over the mobile communication network in order to exchange data with the central server 130.

Figure 5:
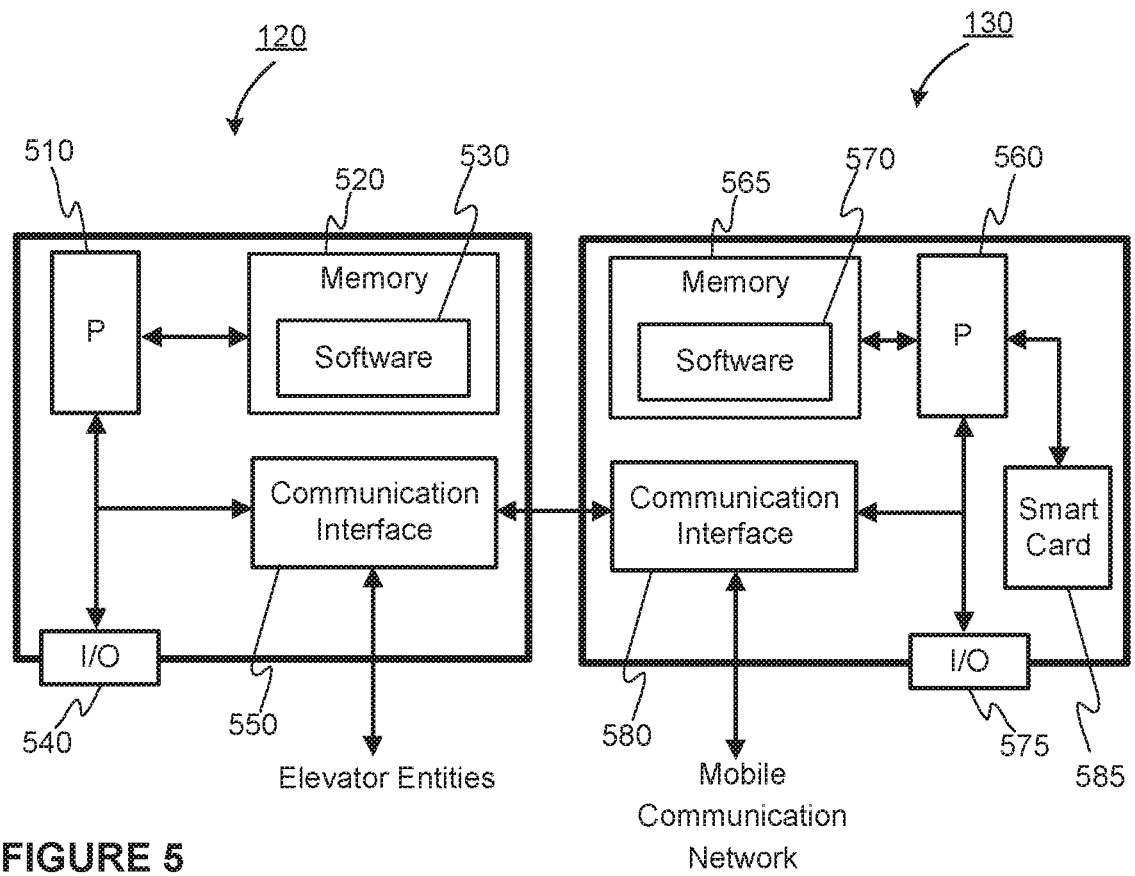
FIG. 5 illustrates schematically a control unit and a transceiver according to an embodiment of the present invention.

FIG. 5 illustrates schematically a control unit 120 and a transceiver 130 according to an embodiment of the invention. The control unit 120 may e.g. comprise one or more processors 510, one or more memories 520 storing data, such as software 530 to be executed by the one or more processor 510 in order to generate instructions for controlling the operation of the control unit 120 and/or any external entities. Furthermore, the control unit 120 may comprise so called input/output devices (I/O) 540 for using the control unit 120 by means of them. The control unit 120 may also comprise one or more communication interfaces comprising transmit/receive TX/RX unit, for example. The mentioned elements may be communicatively coupled to each other either directly or indirectly. The I/O devices 540 refers to any necessary input/output devices by means of which it is possible to input and output data to and from the control unit 120. The I/O devices 540 may also comprise elements specific to the control unit 120 in order to operate e.g. in the communication network in question. Such elements may e.g. be applicable sensors, for example, such as a digital measurement device configured to measure parameter(s) in order to generate necessary data to the central server 300. The sensors may also be external to the control unit 120 and residing e.g. in one or more elevator entities from which a measurement data may be obtained. The communication interface 550 may comprise network adapters, which are necessary to implement the communication of the control unit 120 to at least the network entities but also to the transceiver 130 illustrated as a separate device in FIG. 5. The control unit 120 may also comprise additional elements, such as power source, which are not disclosed in FIG. 5 for clarity reasons. The illustration of the control unit 120 in FIG. 5 is an example and the control unit 120 applied in the solution may vary from the illustrated one.

The transceiver 130, as illustrated in FIG. 5 schematically, may comprise one or more processors 560, one or more memories 565 storing data, such as software 570 to be executed by the one or more processor 560 in order to generate instructions for controlling the operation of the transceiver 130 and/or any external entities. Furthermore, the transceiver 130 may comprise so called input/output devices (I/O) 575 for using the transceiver 130 by means of them. The transceiver 130 may also comprise one or more communication interfaces 580 comprising transmit/receive TX/RX unit, for example. Additionally, the transceiver 130 may be equipped with a smart card 585 comprising subscription to at least to a mobile communication network the transceiver is at least partly using for communication. The subscription may be implemented with a physical smart card, such as SIM card, but also with software. The mentioned elements may be communicatively coupled to each other either directly or indirectly. The I/O devices 575 refers to any necessary input/output devices by means of which it is possible to input and output data to and from the transceiver 130. The I/O devices 575 may also comprise elements specific to the transceiver 130 in order to operate e.g. in the communication network in question. Such elements may e.g. be applicable sensors, for example, such as a digital measurement device configured to measure parameter(s). The communication interface 580 may comprise network adapters, which are necessary to implement the communication of the transceiver 130 to at least the network entities but also to the control unit 120 illustrated as a separate device in FIG. 5. The transceiver 130 may also comprise additional elements, such as power source, which are not disclosed in FIG. 5 for clarity reasons. The illustration of the transceiver 130 in FIG. 5 is an example and the transceiver 130 applied in the solution may vary from the illustrated one.

Figure 6:
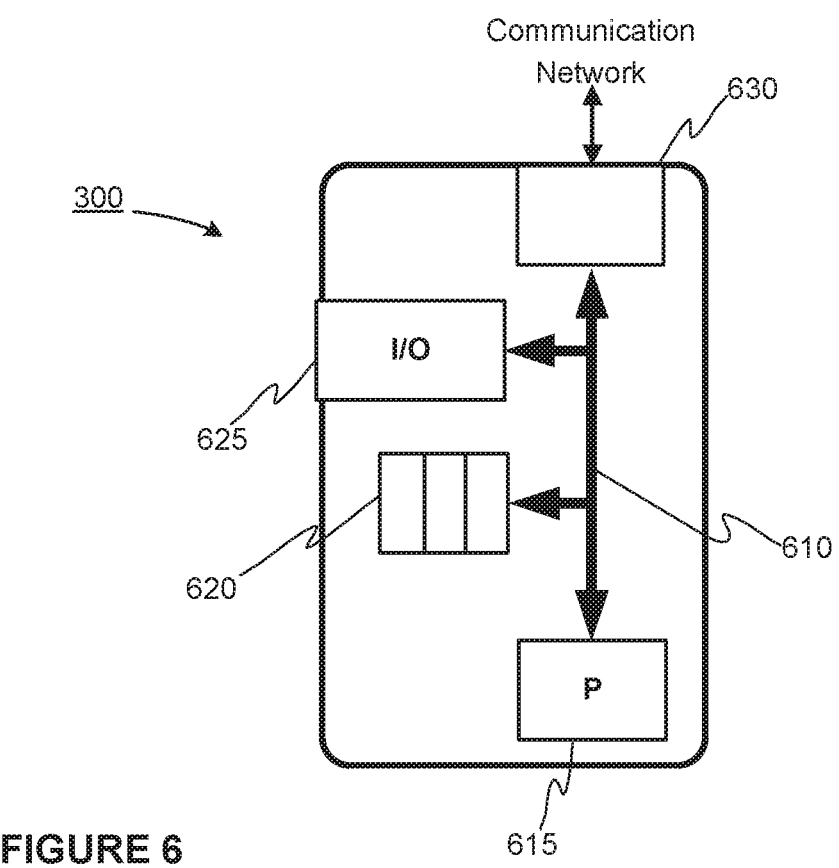
FIG. 6 illustrates schematically an example of a central server according to an embodiment of the present invention.

FIG. 6 illustrates schematically an example of a central server 300 according to an implementation consistent with the principles of the invention. The central server 300 may comprise a bus 610, one or more processors 615, one or more memories 620, input and output devices (I/O) 625 and one or more communication interfaces 630. The bus 610 may include means or methods that enable communication among the internal elements of the central server 300.

The processor 615 may comprise one or more conventional processors, one or more microprocessors, or one or more processing logics, or any combination of these, that interprets and executes instructions defined by portions of computer program code. The memory 620 may store information and instructions in a form of software for execution by the processor 615.

The input means 625 may comprise a conventional mechanism that permits a user to input information to the central server 300, such as a keyboard, a mouse, a pen, a touch screen, voice recognition and/or biometric mechanisms, etc. The output means 625 may comprise a conventional mechanism that outputs information to the user, including a display, a printer, a speaker, etc. The communication interface 630 enables the central server to communicate with other nodes and/or systems through a network, for instance. For example, the communication interface 630 may comprise mechanisms for communicating with external entities such as networks and network elements, such as databases and registers as non-limiting examples.

The implementation of the central server 300 as described above is a non-limiting example. In the context of the present invention the term central server 300 shall be understood to refer to any implementation by means of which the central server functionality as described may be arranged. For example, the functionality may be implemented with so called cloud computing solution wherein so called virtual servers may be configured to implement at least part of the functionality. The same may also apply to the control unit 120 as described above.

As already mentioned the present invention is also applicable in escalator and auto walk solutions in addition to the elevator environment.

As a whole the present invention enables an initiation of the data connection establishment in a sophisticated way. By means of the present invention a service level in the elevator, escalator and autowalk environment may be improved.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method of establishing an Internet Protocol (IP) data connection between a controller and a central server, the controller configured to communicate with an elevator, escalator or autowalk, the method comprising:
receiving, by the controller, a trigger signal from the central server during a voice call setup of a mobile communication network such that the trigger signal is received prior to completion of establishing a voice call, the controller having a subscriber identity module (SIM) card associated therewith, the SIM card being assigned a first unique identifier, the first unique identifier being accessible by the central server such that the central server transmits the trigger signal to the controller based on the first unique identifier without transmitting an IP address of the controller to the central server,
detecting whether the trigger signal complies with at least one requirement based on a second network identifier, identifying the central server, derived from information embedded in the trigger signal received prior to the completion of establishing the voice call, the second network identifier being a unique identifier, and the detecting compliance including comparing the unique identifier received from the central server with information stored in a memory accessible to the controller, and
establishing the IP data connection between the controller and the central server in response to the trigger signal complying with the at least one requirement.

2. The method of claim 1, wherein the establishing comprises:
establishing a Packet Data Protocol (PDP) context connection by,
transmitting a PDP activation request message from the controller to a first network node residing in the mobile communication network,
receiving an active PDP context accept message from the first network node after establishment of a communication channel between the first network node and a second network node in the mobile communication network, and
establishing the IP data connection with the central server based on the IP address of the central server.

3. The method of claim 2, further comprising:
obtaining the IP address of the central server from a memory accessible to the controller in response to the trigger signal complying with the at least one requirement.

4. The method of claim 1, wherein the receiving receives the trigger signal via a voice call setup request message from the central server based on the first unique identifier.

5. The method of claim 1, wherein the establishing establishes the IP data connection to the central server based on an IP address of the central server rather than the central server establishing the IP data connection with the controller based on the IP address of the controller.

6. A controller of an elevator, escalator or autowalk, the controller comprising:

at least one memory; and at least one processor configured to execute computer program code stored in the at least one memory to configure the controller to, receive a trigger signal from a central server during a voice call setup of a mobile communication network such that the trigger signal is received prior to completion of establishing a voice call, the controller having a subscriber identity module (SIM) card associated therewith, the SIM card being assigned a first unique identifier, the first unique identifier being accessible by the central server such that the central server transmits the trigger signal to the controller based on the first unique identifier without transmitting an IP address of the controller to the central server, detect whether the trigger signal complies with at least one requirement based on a second network identifier, identifying the central server, derived from information embedded in the trigger signal received prior to the completion of establishing the voice call, the second network identifier being a unique identifier, and the processor configured to detect compliance by comparing the unique identifier received from the central server with information stored in a memory accessible to the controller, and establish an Internet Protocol (IP) data connection between the controller and the central server in response to the trigger signal complying with the at least one requirement.

7. The controller of claim 6, wherein the controller is configured to establish the IP data connection by, transmitting a PDP activation request message from the controller to a first network node residing in the mobile communication network, receiving an active PDP context accept message from the first network node after establishment of a communication channel between the first network node and a second network node in the mobile communication network, and establishing the IP data connection with the central server based on the IP address of the central server.

8. The controller of claim 7, wherein the controller is further configured to obtain the IP address of the central server from the at least one in response to the trigger signal complying with the at least one requirement.

9. The controller of claim 6, wherein the central server transmits the trigger signal via a voice call setup request message to the controller based on the first unique identifier.

10. The controller of claim 6, wherein the controller is configured to establish the IP data connection to the central server based on an IP address of the central server rather than the central server establishing the IP data connection with the controller based on the IP address of the controller.

* * * * *